US012049382B2

(12) United States Patent
Simcik et al.

(10) Patent No.: US 12,049,382 B2
(45) Date of Patent: Jul. 30, 2024

(54) MANAGEMENT OF ELEVATOR SERVICE

(71) Applicant: Otis Elevator Company, Farmington, CT (US)

(72) Inventors: Paul A. Simcik, Southington, CT (US); Pradeep Miriyala, Telangana (IN); Ranjith Vushakola, Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1232 days.

(21) Appl. No.: 16/381,880

(22) Filed: Apr. 11, 2019

(65) Prior Publication Data

US 2020/0324998 A1 Oct. 15, 2020

(51) Int. Cl.

| | |
|---|---|
| ***B66B 1/24*** | (2006.01) |
| ***B66B 1/34*** | (2006.01) |
| ***G07C 9/27*** | (2020.01) |
| ***G07C 9/29*** | (2020.01) |

(52) U.S. Cl.

CPC .......... *B66B 1/2408* (2013.01); *B66B 1/3461* (2013.01); *G07C 9/27* (2020.01); *G07C 9/29* (2020.01); *B66B 2201/23* (2013.01)

(58) Field of Classification Search

CPC ..... B66B 13/00; B66B 1/3461; B66B 1/2408; B66B 1/34; B66B 1/24

See application file for complete search history.

(56) References Cited

U.S. PATENT DOCUMENTS 7,945,951 B2 * 5/2011 Yadav ................. G06F 9/45512 726/16
10,157,512 B2 * 12/2018 Simcik ................... G05B 15/02
10,486,937 B2 * 11/2019 Baldi .................... B66B 13/165
10,991,190 B1 * 4/2021 Luthra ..................... G07C 9/27
2005/0077348 A1 * 4/2005 Hendrick ............. G06K 7/0021 235/382
2015/0075914 A1 * 3/2015 Armistead ......... G06Q 10/1093 187/247
2016/0009525 A1 * 1/2016 DePaola ................. B66B 1/468 340/5.61
2016/0221791 A1 * 8/2016 Berryhill ............... B66B 1/2458
2016/0277560 A1 * 9/2016 Gruberman ........ G06Q 20/3221
2016/0325962 A1 * 11/2016 Blandin ................ B66B 1/3461
2016/0376124 A1 * 12/2016 Bünter .................... B66B 1/468 187/247
2017/0174473 A1 * 6/2017 Simcik .................. G06F 3/0486

(Continued)

FOREIGN PATENT DOCUMENTS

EP 3401259 A1 11/2018
EP 3722238 A1 * 10/2020 ........... B66B 1/2408

(Continued)

OTHER PUBLICATIONS

European Search Report for Application No. 19215409.4, Issued Jul. 27, 2020, 8 Pages.

*Primary Examiner* — Daniel I Walsh

(74) *Attorney, Agent, or Firm* — CANTOR COLBURN LLP

(57) ABSTRACT

A method includes creating an account with an elevator system; assigning a primary user to the account; assigning a secondary user to the account; associating elevator access privileges to the secondary user, the elevator access privileges including floors of a building that the secondary user can access via the elevator system.

19 Claims, 7 Drawing Sheets

(56) References Cited

U.S. PATENT DOCUMENTS

2017/0217727 A1* 8/2017 Scoville .................. B66B 1/468
2018/0118509 A1* 5/2018 Simcik .................... B66B 1/468
2018/0118511 A1* 5/2018 Baldi .................... G06F 3/0485
2018/0282113 A1* 10/2018 Simcik .................. G06F 3/0488
2018/0282114 A1* 10/2018 Baldi ...................... B66B 1/468
2018/0282115 A1* 10/2018 Baldi .................... G06F 3/0482
2018/0282116 A1* 10/2018 Tschuppert ............. B66B 1/463
2018/0286157 A1* 10/2018 Simcik ..................... G07C 9/27
2019/0002237 A1* 1/2019 Scoville .................. B66B 1/468
2019/0031467 A1* 1/2019 Simcik .................. G06F 3/0482
2019/0100405 A1* 4/2019 Scoville ................ B66B 1/3453
2019/0112149 A1* 4/2019 Wedzikowski ......... B66B 3/006
2019/0122462 A1* 4/2019 Wedzikowski ......... B66B 1/468
2019/0135580 A1* 5/2019 Scoville .................. B66B 1/468
2019/0168993 A1* 6/2019 Kuenzi ................. B66B 1/2458
2019/0382236 A1* 12/2019 Halingale ............... B66B 1/468
2019/0389690 A1* 12/2019 Pahlke ...................... B66B 1/28
2020/0065840 A1* 2/2020 Pinel ........................ H04W 4/02
2020/0130995 A1* 4/2020 Atla ........................ B66B 1/468
2020/0165100 A1* 5/2020 Kanteti ................. B66B 1/2408
2020/0290842 A1* 9/2020 Begle .................... B66B 1/3423
2020/0324998 A1* 10/2020 Simcik ..................... G07C 9/29
2021/0214186 A1* 7/2021 Hiltunen ................. B66B 3/006
2021/0323789 A1* 10/2021 Mascari .................. B66B 1/468
2021/0347603 A1* 11/2021 Frossard ............. G06F 3/04886
2021/0358247 A1* 11/2021 Novozhenets ........... G07C 9/27
2022/0017327 A1* 1/2022 Adifon .................. B66B 19/007
2022/0048732 A1* 2/2022 Adifon .................... B66B 1/468
2022/0048734 A1* 2/2022 Adifon .................. B66B 1/2408
2022/0073316 A1* 3/2022 Adifon .................. B66B 1/3492
2023/0271807 A1* 8/2023 Belov ..................... B66B 3/006
187/388
2023/0298416 A1* 9/2023 Luthra ................... G16H 10/40
340/5.52

FOREIGN PATENT DOCUMENTS

WO 2017058715 A1 4/2017
WO 2018224426 A1 12/2018

* cited by examiner

| Primary User ID (702) | Secondary User ID (704) | Home Floor (706) | Floor Permissions (708) | Monitored Elevator Services (710) | Video destination (712) |
|---|---|---|---|---|---|
| Mr. S | Reiner S. | 16 | L, 8, 15, 16 | Enabled | 10.0.0.1 |
| Mr. S | Max S. | 16 | L, 8, 10, 15, 16 | Enabled | 10.0.0.1<br>888-555-1212 |
| | | | | | |
| | | | | | |

FIG. 7

MANAGEMENT OF ELEVATOR SERVICE

BACKGROUND

The embodiments herein relate to managing elevator service.

Existing elevator systems allow passengers unlimited access to all floors of a building. Other elevator systems may use keycards or other user identifiers to control access to floors of a building. Such systems require interaction with an access control entity, such as building management and/or building security. When a user is granted access to floors of a building, each user typically meets with the access control entity to receive a key card, encode the key card, update privileges in an access system, etc. When the user loses access to floors of the building, the key card must be deactivated and the access system updated, again involving resources of the access control entity.

SUMMARY

According to an embodiment, a method includes creating an account with an elevator system; assigning a primary user to the account; assigning a secondary user to the account; associating elevator access privileges to the secondary user, the elevator access privileges including floors of a building that the secondary user can access via the elevator system.

In addition to one or more of the features described herein, or as an alternative, further embodiments may include wherein the elevator access privileges associated with the secondary user include floors of the building that the secondary user cannot access via the elevator system.

In addition to one or more of the features described herein, or as an alternative, further embodiments may include associating an identifier with the secondary user.

In addition to one or more of the features described herein, or as an alternative, further embodiments may include receiving a request for elevator service from the secondary user; providing the floors of the building that the secondary user can access via the elevator system to a mobile device associated with the secondary user.

In addition to one or more of the features described herein, or as an alternative, further embodiments may include wherein receiving a selection of a destination floor from the mobile device associated with the secondary user; initiating elevator service to the destination floor for the secondary user.

In addition to one or more of the features described herein, or as an alternative, further embodiments may include wherein receiving a selection of a starting floor and a destination floor from the mobile device associated with the secondary user; initiating elevator service from the starting floor to the destination floor for the secondary user.

In addition to one or more of the features described herein, or as an alternative, further embodiments may include associating a home floor with the secondary user; receiving a selection of the home floor from a mobile device associated with the secondary user; initiating elevator service to the home floor for the secondary user.

In addition to one or more of the features described herein, or as an alternative, further embodiments may include associating monitored elevator services with the secondary user.

In addition to one or more of the features described herein, or as an alternative, further embodiments may include receiving a request for elevator service from the secondary user; assigning an elevator car to the secondary user; enabling a camera within the elevator car assigned to the secondary user.

In addition to one or more of the features described herein, or as an alternative, further embodiments may include wherein the assigning the elevator car to the secondary user comprises disabling further elevator calls for the elevator car.

In addition to one or more of the features described herein, or as an alternative, further embodiments may include wherein the assigning the elevator car to the secondary user comprises confirming that the elevator car is empty.

In addition to one or more of the features described herein, or as an alternative, further embodiments may include enabling further elevator calls for the elevator car upon the secondary user exiting the elevator car.

In addition to one or more of the features described herein, or as an alternative, further embodiments may include providing video from the camera to a first device.

In addition to one or more of the features described herein, or as an alternative, further embodiments may include wherein the first device is associated with the primary user.

In addition to one or more of the features described herein, or as an alternative, further embodiments may include wherein the account includes an address of the first device.

In addition to one or more of the features described herein, or as an alternative, further embodiments may include terminating providing the video from the camera to the first device upon the secondary user exiting the elevator car.

In addition to one or more of the features described herein, or as an alternative, further embodiments may include wherein associating the monitored elevator services with the secondary user comprises accessing the account and verifying that a monitored elevator services field associated with the secondary user is enabled.

In addition to one or more of the features described herein, or as an alternative, further embodiments may include deleting the secondary user from the account.

According to another embodiment, an elevator system includes a processor configured to execute operations including: creating an account with the elevator system; assigning a primary user to the account; assigning a secondary user to the account; associating elevator access privileges to the secondary user, the elevator access privileges including floors of a building that the secondary user can access via the elevator system.

According to another embodiment, a computer program product is tangibly embodied on a computer readable medium, the computer program product including instructions that, when executed by a processor, cause the processor to perform operations for providing elevator services, the operations comprising: creating an account with an elevator system; assigning a primary user to the account; assigning a secondary user to the account; associating elevator access privileges to the secondary user, the elevator access privileges including floors of a building that the secondary user can access via the elevator system.

Technical effects of embodiments of the present disclosure include the ability to assign elevator access privileges to users and the provide monitored elevator service to users.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 7 depicts user profiles for secondary users in an example embodiment.

DETAILED DESCRIPTION

Figure 1:
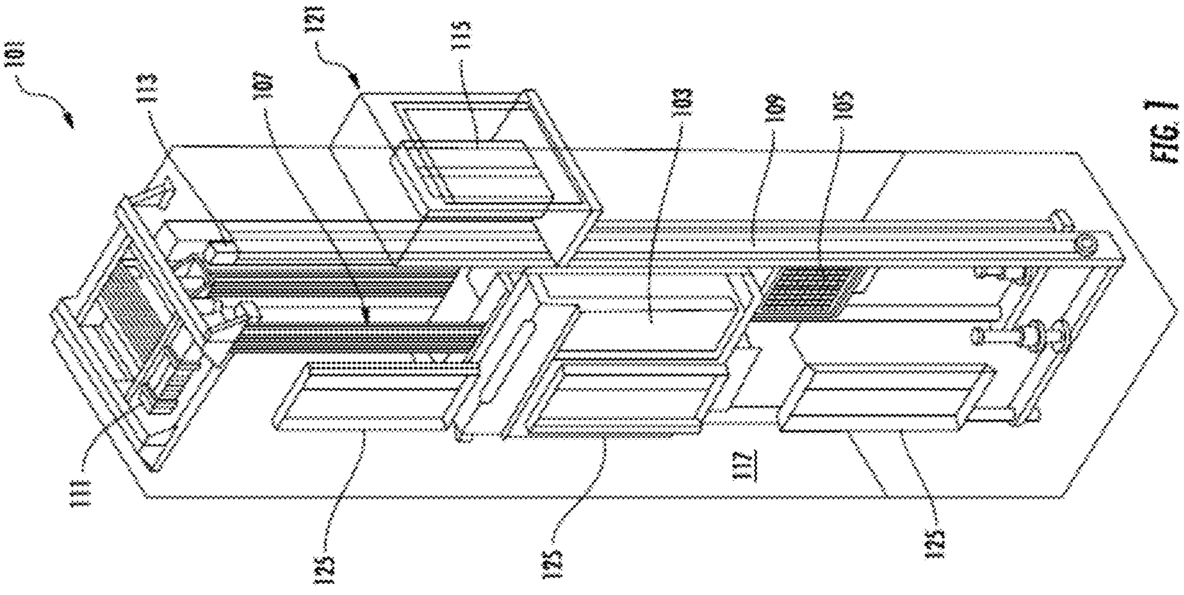
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
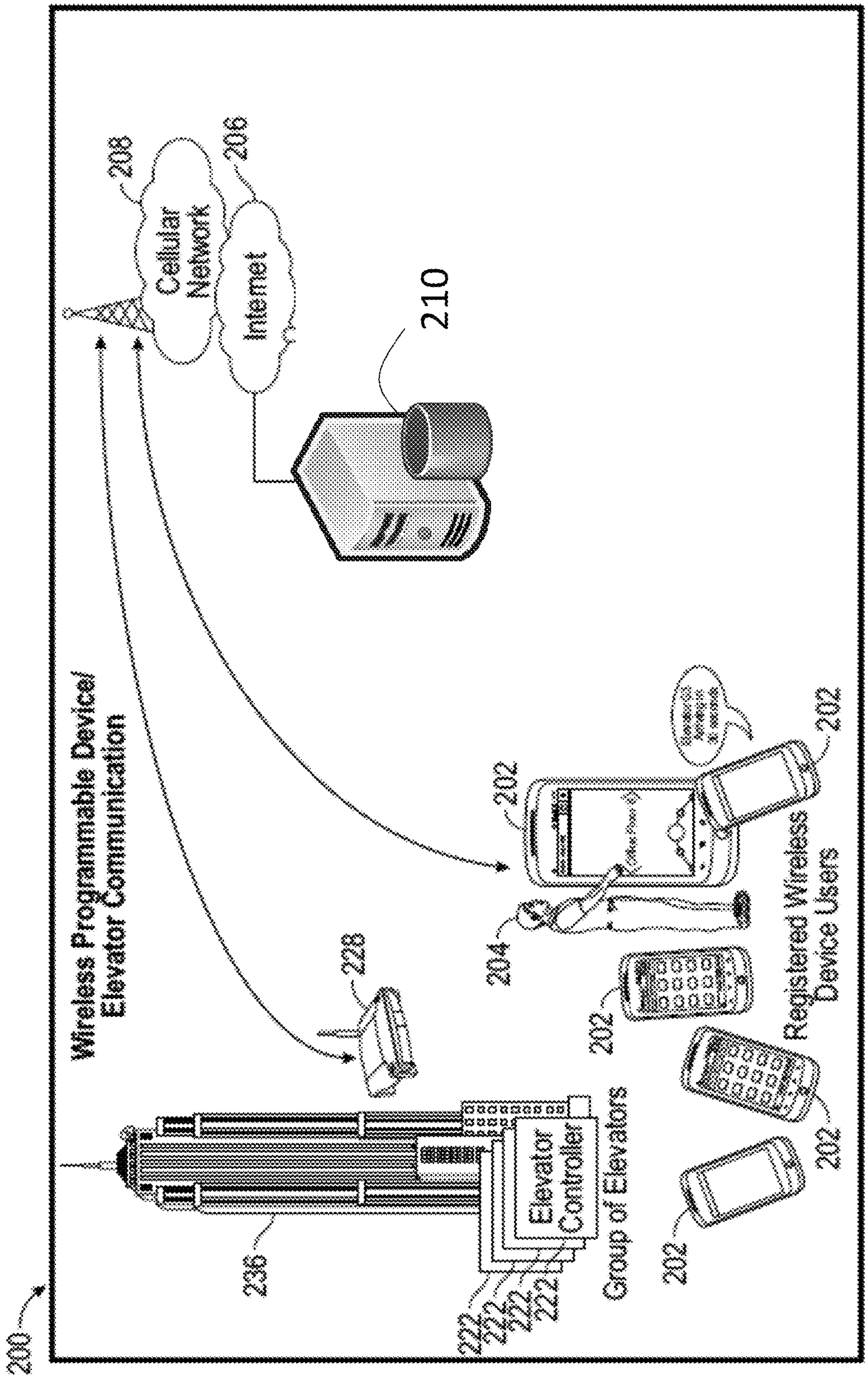
FIG. 2 depicts a system for managing elevator access privileges in an example embodiment.

Turning now to FIG. 2, an exemplary elevator system 200 in accordance with one or more embodiments is shown. The elevator system 200 may include one or more mobile devices 202, such as a phone, a laptop, a tablet, smartwatch, etc. One or more of the mobile devices 202 may be associated with a particular user 204. The user 204 may use his/her mobile device(s) 202 to request a service, such as an elevator service at a building 236. The mobile device 202 may request service in an affirmative or active manner. For example, the user 204 may enter an explicit request for elevator service using an I/O interface of the mobile device 202.

The request for service may be conveyed or transmitted from the mobile device 202 over one or more networks. A request for service may be sent from mobile a device 202 to an elevator controller 222 over a local network. In other example embodiments, the request for service may be transmitted via the Internet 206 and/or a cellular network 208. The service request may then be routed through a device 228, such as a gateway or modem at the building 236. The device 228 may be configured to monitor for service requests. The device 228 may be coupled to an access server 210 and/or the networks 206, 208 via one or more mediums, such as a phone line, a cable, a fiber optic line, etc.

The service request, once received at the device 228 is forwarded to an elevator controller 222. The elevator controller(s) 222 may be configured to communicate with the device 228 and/or one another to fulfill service requests. In this respect, it should be noted that service requests might not only originate from mobile devices 202 but may also originate locally (e.g., within a building 236 in which the controllers 222 may be located or in which the requested service(s) may be provided). The controllers 222 may select a resource (e.g., an elevator system or elevator car) that is suited to fulfill a service request, potentially based on one or more considerations, such as power consumption/efficiency, quality of service (e.g., reduction in waiting time until a user or passenger arrives at a destination floor or landing), etc.

The access server 210 may be implemented using known computing equipment (processor, memory, I/O devices, network communications, etc.). The access server 210 stores a user profile for users. The user profile contains elevator access privileges such as floor permissions and floor restrictions for each user. A method of configuring a user profile is depicted in FIG. 3.

Figure 3:
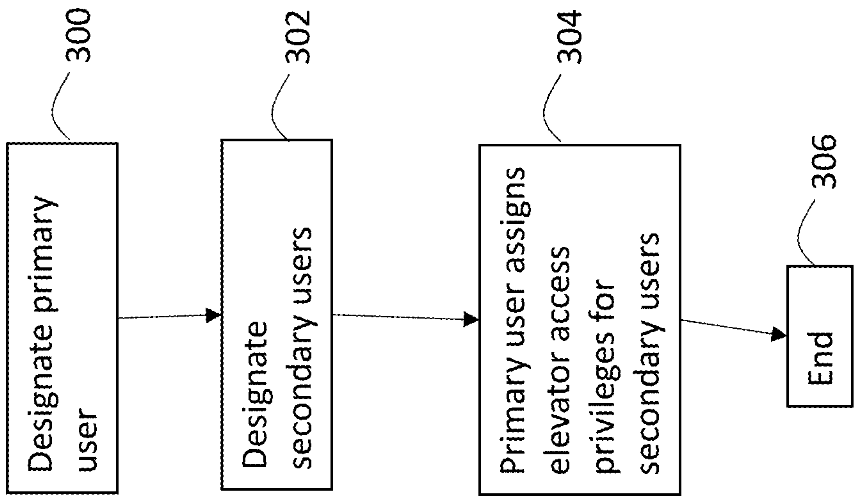
FIG. 3 depicts a method for managing elevator access privileges in an example embodiment.

Referring to FIG. 3, a process for configuring a user profile begins at 300 where a user is designated as a primary user. This may be achieved by the user interacting with the access server 210 to create an account, provide identifying data, login identifier, password, etc. A mobile device identifier (e.g., phone number, MIN) may be stored in the account to identify the user by the mobile device 202 being used. The access server 210 stores the account information and the name of the primary user associated with the account. The primary user has the right to assign elevator access privileges to other users. The primary user may be, for example, a parent who wants to control which floors in the building 236 their child may access. In other embodiments, the primary user may be a supervisor of a team (e.g., cleaning crew, maintenance, etc.) who wants to control which floors in the building 236 their team may access. The primary user may register with a security system used in the building 236. There may be more than one primary user (e.g., a husband and wife).

Once the primary user is designated, the access server 210 stores the account information along with the identity of the primary user. The method flow proceeds to 302 where one or more secondary users are designated by the primary user. In other embodiments, secondary users may be designated through a building security system or staff. In the example where the primary user is a parent, the secondary users may be the children of the parent residing in the building 236. The primary user interacts with the access server 210 to identify secondary users for the account. One or more identifiers is associated with each secondary user, such as account number, name, relationship to primary user, mobile device identifier (e.g., phone number), etc. The secondary users associated with the account are stored in the access server 210. A primary user, and/or building security system or staff, may also delete a secondary user from the account.

Once the secondary users are designated at 302, flow proceeds to 304 where the primary user assigns elevator access privileges to each secondary user. The elevator access privileges may include floors of the building 236 and include floor permissions (e.g., floors that the secondary user can access via the elevator system) and floor restrictions (floors the secondary user cannot access via the elevator system). The elevator access privileges for each secondary user are stored on the access server 210, along with the associated secondary user identifiers. Once the primary user has finished identifying each secondary user and assigning elevator access privileges, the process ends at 306.

Figure 4:
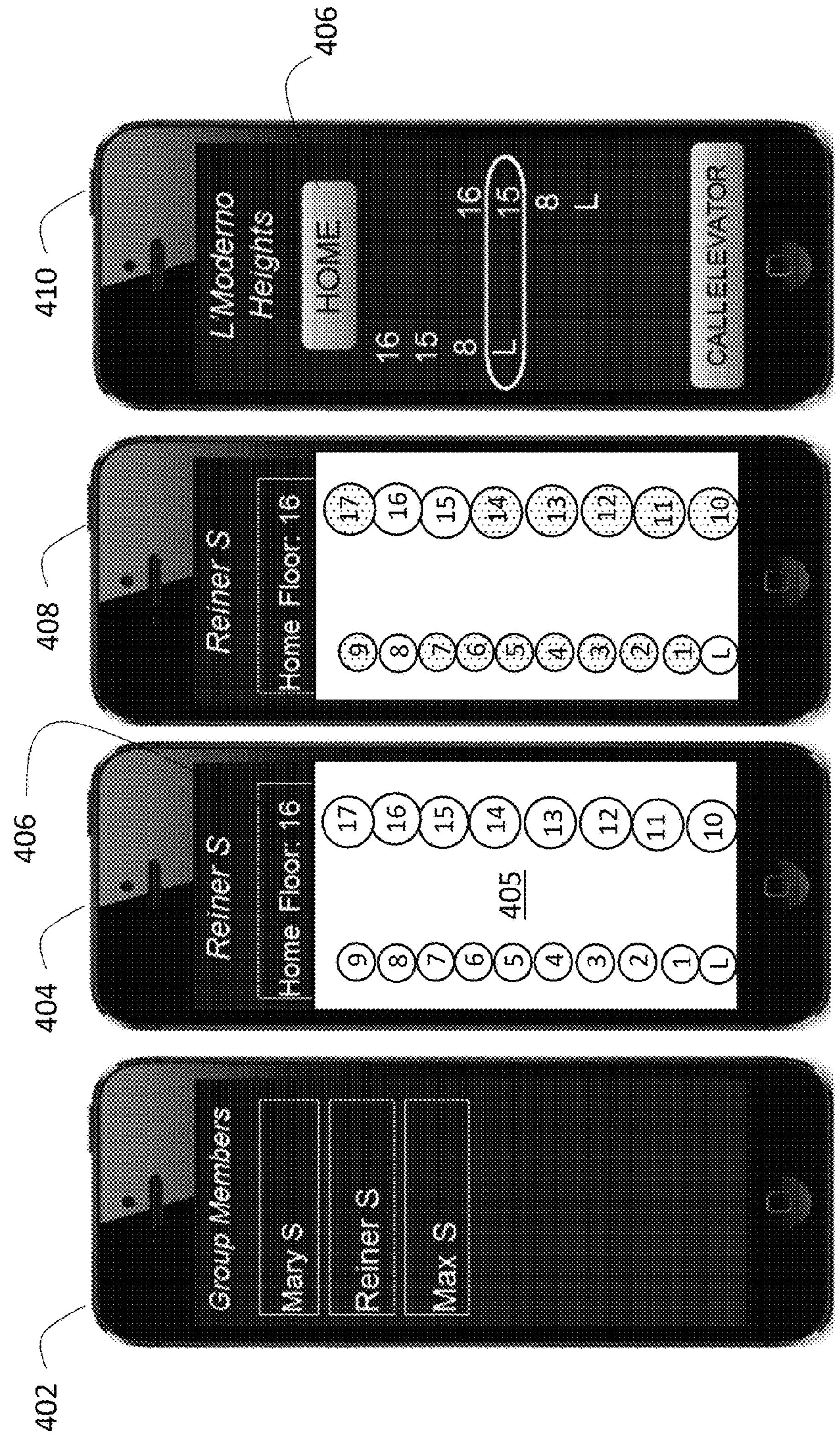
FIG. 4 depicts a user interface for managing elevator access privileges in an example embodiment.

FIG. 4 depicts a user interface for managing elevator access privileges in an example embodiment. When the primary user logs into their account on the access server 210, the primary user can view all the secondary users associated with that account, as shown at graphical user interface 402 in FIG. 4. Upon selection of a secondary user (Reiner S. in this example), the graphical user interface 404 is presented. The graphical user interface 404 depicts all the possible floors in the building 236 with floor indicators 405. In the example shown in FIG. 4, no elevator access privileges have been associated with the secondary user. The graphical user interface 404 indicates default settings in which the secondary user, Reiner S. in this example, has access to all floors of the building 236. A home floor indicator 406 may also be used to indicate a home floor associated with the secondary user. This home floor may be assigned by the primary user. The home floor is stored on the access server 210, along with the associated secondary user identifiers.

Through the graphical user interface 404, the primary user can select floors that the secondary user is permitted to visit (e.g., floor permissions) and floors that the secondary user is prohibited from visiting (e.g., floor restrictions). The primary user may toggle a floor indicator 405 on and off to change state from permitted to restricted. In the example of FIG. 4, the primary user has selected floors L, 8, 15 and 16 as floors that the secondary user is permitted to visit. The remaining floors are greyed-out as being corresponding to floors the secondary user is prohibited from visiting. The resultant floor listing is shown in the user interface 408. The primary user may also select the home floor indicator 406 and edit the floor associated with the home floor for this secondary user. The graphical user interfaces 402, 404 and 408 are simply examples of how a primary user may assign elevator access privileges for a secondary user. The floors that the secondary user is permitted to visit (e.g., floor permissions) and the floors that the secondary user is prohibited from visiting (e.g., floor restrictions) may be stored on the access server 210, along with the associated secondary user identifiers. It is understood that a variety of other graphical user interfaces may be used and embodiments are not limited to those shown in FIG. 4.

Graphical user interface 410 in FIG. 4 depicts the user interface on the secondary user's mobile device 202 when requesting elevator service. The secondary user's mobile device communicates with the access server 210 to retrieve the floors that the secondary user is permitted to visit. The graphical user interface 410 only lists floors L, 8, 15 and 16, as these floors are the floors that the secondary user is permitted to visit. In the example graphical user interface 410, the user can select a starting floor and a destination floor from the list of floors that the secondary user is permitted to visit. Upon selecting a starting floor and a destination floor, the request for elevator service is sent to the elevator controller 222 to initiate elevator service. The secondary user may also select the home indicator 406 to initiate a request for elevator service to the home floor.

Figure 5:
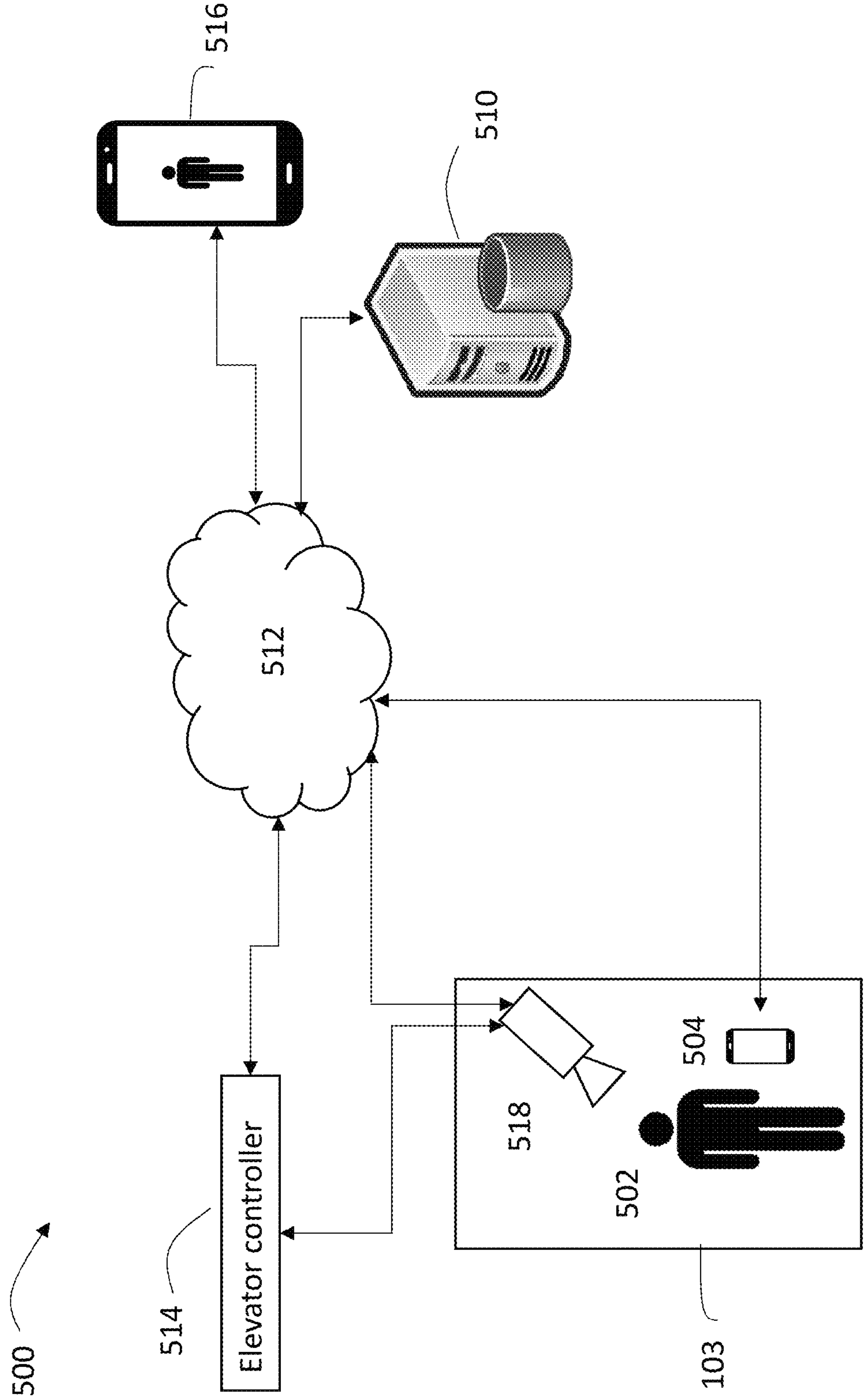
FIG. 5 depicts an elevator system for providing monitored elevator services in an example embodiment.

FIG. 5 depicts an elevator system 500 for providing monitored elevator services in an example embodiment. Monitored elevator services allow a first user to view live video of a second user as the second user travels in an elevator car 103. In the example in FIG. 5, a second user 502 has requested elevator service using a device 504, such as a phone, a laptop, a tablet, smartwatch, destination entry terminal, kiosk, etc. The second user may request monitored elevator service through a user interface on the device 504. Alternately, the second user may be a secondary user having a user profile that designates monitored elevator services. As described above, a primary user may create a user profile for a secondary user. The user profile of the secondary user may include a monitored elevator service option so that when the monitored elevator service option is enabled, elevator service for the second user is monitored.

A monitoring server 510 is connected to a network 512. The monitoring server 510 may be implemented using known computing equipment (processor, memory, I/O devices, network communications, etc.). The monitoring server 510 may be implemented using the same equipment the access server 210 or may be a separate component. The network 512 may be a local network (e.g., 802.xx) or a wide range network (e.g., cellular) and may be implemented using known wired and/or wireless network protocols. An elevator controller 514 is in communication with the network 512 and a camera 518 installed in the elevator car 103. In other embodiments, the camera 518 operates separately from the elevator controller 514. The elevator controller 514 may control operation of the elevator car 103 including travel up and down, door open/close, etc. The elevator controller 514 may be the same as controller 115 of FIG. 1. The camera 518 is mounted in the elevator car 103 and is in communication with the monitoring server 510 over network 512.

A first device 516 is also in communication with the network 512. The first device 516 may be a mobile device, such as a phone, a laptop, a tablet, smartwatch, etc. or may be a stationary device, such as a network enabled television, desktop computer, etc. The first device 516 may be associated with a first user, for example, a primary user that has created the user profile for the second user 502, a secondary user. In one example, the first user is a parent of the second user, and has configured the user profile of the second user so that the second user is provided with monitored elevator service. In another example, the first user is a caregiver of the second user, and has configured the user profile of the second user so that the second user is provided with monitored elevator service. The system may include multiple first devices 516, each of which can receive video from the interior of the elevator car 103.

Figure 6:
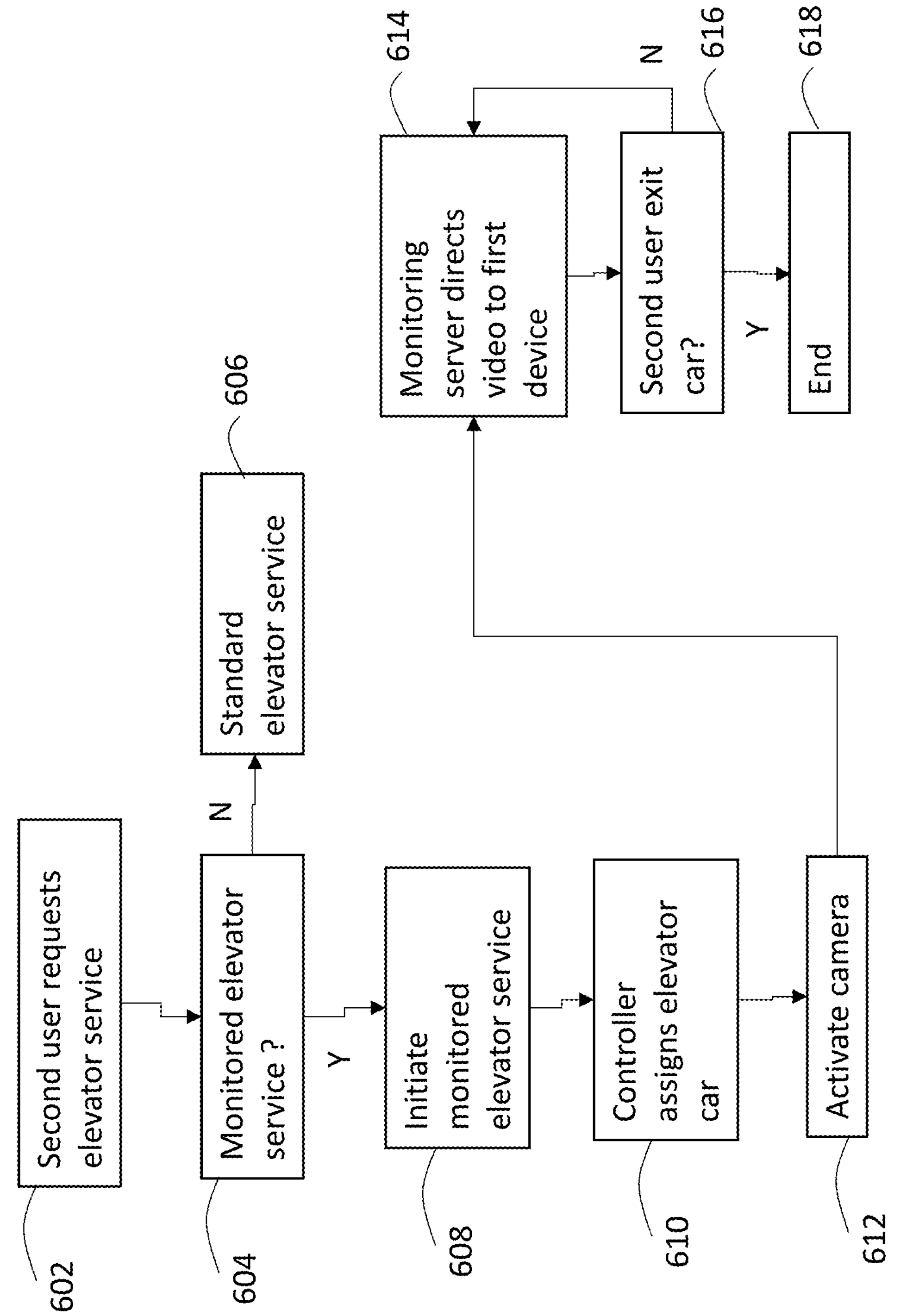
FIG. 6 depicts a process for providing monitored elevator services in an example embodiment.

FIG. 6 depicts a process for providing monitored elevator services in an example embodiment. At 602, the second user 502 requests elevator service. At 604, the monitoring server 510 determines if the elevator service should be monitored elevator service. This may be accomplished by accessing the user profile of the second user and determining if the monitored elevator services option is enabled. Monitored elevator services may also be requested by the second user 502, through the device 504 or some other input (e.g., a kiosk for entering elevator calls).

If monitored elevator service is not indicated, then flow proceeds to 606 where standard elevator service is provided to the second user. If monitored elevator service is indicated, then flow proceeds to 608 where the monitoring server 510 sends a command to the elevator controller 514 to initiate monitored elevator service for the second user 502. At 610, the elevator controller 514 assigns a monitored elevator car 103 to the second user 502. The monitored elevator car 103 may, optionally, be required to be empty, so no other passengers are assigned to the monitored elevator car 103 during travel by the second user 502. The camera 518 (or other occupancy detectors) may be used to detect if other passengers are in the monitored elevator car 103. The monitored elevator car 103 may also be selected as one having high reliability and/or low noise. One or more sensors (e.g., accelerometers, gyroscope, vibration sensor, microphone, etc.) may be mounted on the elevator cars 103 to record noise and/or overall ride quality of the elevator cars 103. The elevator controller 514 may also disable any further elevator calls for the monitored elevator car 103 so that the second user 502 travel alone (or with companions, if applicable).

At 612, the camera 518 is activated to provides a live stream video of the interior of the elevator car 103 to the monitoring server 510. The elevator controller 514 or the monitoring server 510 may send a command to the camera 518 to begin capturing video. At 614, the monitoring server 510 directs the video to the first device 516. The monitoring server 510 can access the user profile of the second user 502 and/or the user profile of the first user to retrieve an address of the first device 516 (e.g., an IP address, MAC address, phone number, email address, etc.). The monitoring server 510 can direct the video to multiple first devices 516. The monitoring server 510 may also direct the video to security personnel for monitoring of the second user 502.

At 616, it is determined if the second user 502 has exited the elevator car 103. This may be performed by the elevator controller 514 detecting a door open condition at the destination floor of the second user 502. The elevator controller 514 may also use sensor data from the elevator car 103 to detect the second user exiting the elevator car 103 (e.g., people counter, weight sensor, occupancy sensor, etc.). Alternatively, or in addition, the monitoring server 510 may use video analytics to detect when the second user 502 has exited the elevator car 103. The elevator controller 514 may keep the elevator cars doors open until it is confirmed the second user has exited the elevator car 103.

The monitoring server 510 continues providing the video of the interior of the elevator car 103 to the first device 516 until the second user exits the elevator car as determined at 616. Upon the second user 502 exiting the elevator car 103, the process ends at 618 and the elevator controller 514 terminates the monitored elevator services for the elevator car 103.

FIG. 7 depicts user profiles for secondary users associated with an account in an example embodiment. A primary user identification field 702 includes a primary user identifier associated with the primary user of the elevator services account. The primary user identifier may be a user-generated identifier and/or an identifier of a mobile device associated with the primary user. A secondary user identification field 704 includes a secondary user identifier associated with the secondary user of the elevator services account. The secondary user identifier may be a user-generated identifier and/or an identifier of a mobile device associated with the secondary user. A home floor field 706 identifies a floor to which a user can automatically travel upon selection of the home floor indicator 406 (FIG. 4). A floor permissions field 708 indicates the floors that the secondary user is permitted to visit. A monitored elevator services field 710 indicates whether monitored elevator services are enabled for a secondary user. The monitored elevator services field 710 may toggled between enabled and disabled, so that the monitored elevator services can be turned on and off. A video destination field 712 indicates an address of the first device 516 (e.g., an IP address, MAC address, phone number, email address, etc.) to which video from the interior of the elevator car is directed. The video destination field 712 may include multiple addresses.

Embodiments allow a primary user, such as a parent, to establish elevator access privileges, such as floor permissions and floor restrictions, for one or more secondary users. Embodiments also allow a primary user to receive live video from an elevator car when a secondary user is traveling in the elevator system.

As described above, embodiments can be in the form of processor-implemented processes and devices for practicing those processes, such as the elevator controller, the access server and/or the monitoring server. Embodiments can also be in the form of computer program code containing instructions embodied in tangible media, such as network cloud storage, SD cards, flash drives, floppy diskettes, CD ROMs, hard drives, or any other computer-readable storage medium. Embodiments can also be in the form of computer program code transmitted over some transmission medium, such as over electrical wiring or cabling, through fiber optics, or via electromagnetic radiation. When implemented on a general-purpose microprocessor, the computer program code configures the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method comprising:
- creating an account with an elevator system;
- assigning a primary user to the account;
- assigning a secondary user to the account;
- associating elevator access privileges to the secondary user, the elevator access privileges including floors of a building that the secondary user can access via the elevator system;
- receiving a request for elevator service from the secondary user;
- providing the floors of the building that the secondary user can access via the elevator system to a mobile device associated with the secondary user;
- receiving a selection of a destination floor from the mobile device associated with the secondary user, wherein the selection of the destination floor is made by the secondary user at the mobile device associated with the secondary user;
- initiating elevator service to the destination floor for the secondary user.

2. The method of claim 1 wherein:
- the elevator access privileges associated with the secondary user include floors of the building that the secondary user cannot access via the elevator system.

3. The method of claim 1 further comprising:
- associating an identifier with the secondary user.

4. The method of claim 1 further comprising:
- receiving a selection of a starting floor and the destination floor from the mobile device associated with the secondary user;
- initiating elevator service from the starting floor to the destination floor for the secondary user.

5. The method of claim 1 further comprising:
- associating a home floor with the secondary user;
- receiving a selection of the home floor from a mobile device associated with the secondary user;
- initiating elevator service to the home floor for the secondary user.

6. The method of claim 1 further comprising:
- associating monitored elevator services with the secondary user.

7. The method of claim 6 further comprising:
- receiving a request for elevator service from the secondary user;
- assigning an elevator car to the secondary user;
- enabling a camera within the elevator car assigned to the secondary user.

8. The method of claim 7 wherein:
- the assigning the elevator car to the secondary user comprises disabling further elevator calls for the elevator car.

9. The method of claim 7 wherein:
- the assigning the elevator car to the secondary user comprises confirming that the elevator car is empty.

10. The method of claim 8 further comprising:
- enabling further elevator calls for the elevator car upon the secondary user exiting the elevator car.

11. The method of claim 7 further comprising:
- providing video from the camera to a first device.

12. The method of claim 11 wherein:
- the first device is associated with the primary user.

13. The method of claim 12 wherein:
- the account includes an address of the first device.

14. The method of claim 11 further comprising:
- terminating providing the video from the camera to the first device upon the secondary user exiting the elevator car.

15. The method of claim 6 wherein:
- associating the monitored elevator services with the secondary user comprises accessing the account and verifying that a monitored elevator services field associated with the secondary user is enabled.

16. The method of claim 1 further comprising:
- deleting the secondary user from the account.

17. An elevator system comprising:
- a processor configured to execute operations including:
  - creating an account with the elevator system;
  - assigning a primary user to the account;
  - assigning a secondary user to the account;
  - associating elevator access privileges to the secondary user, the elevator access privileges including floors of a building that the secondary user can access via the elevator system;
  - receiving a request for elevator service from the secondary user;
  - providing the floors of the building that the secondary user can access via the elevator system to a mobile device associated with the secondary user;
  - receiving a selection of a destination floor from the mobile device associated with the secondary user, wherein the selection of the destination floor is made by the secondary user at the mobile device associated with the secondary user;
  - initiating elevator service to the destination floor for the secondary user.

18. A computer program product tangibly embodied on a non-transitory computer readable medium, the computer program product including instructions that, when executed by a processor, cause the processor to perform operations for providing elevator services, the operations comprising:

creating an account with an elevator system;

assigning a primary user to the account;

assigning a secondary user to the account;

associating elevator access privileges to the secondary user, the elevator access privileges including floors of a building that the secondary user can access via the elevator system;

receiving a request for elevator service from the secondary user;

providing the floors of the building that the secondary user can access via the elevator system to a mobile device associated with the secondary user;

receiving a selection of a destination floor from the mobile device associated with the secondary user, wherein the selection of the destination floor is made by the secondary user at the mobile device associated with the secondary user;

initiating elevator service to the destination floor for the secondary user.

19. The method of claim 1 wherein initiating elevator service to the destination floor for the secondary user includes an elevator controller initiating sending an elevator car to the secondary user.

* * * * *